United States Patent [19]
Cherry

[11] 3,947,357
[45] Mar. 30, 1976

[54] ORGANIC WASTE DISPOSAL DEVICE

[75] Inventor: Richard Sutton Cherry, Don Mills, Canada

[73] Assignee: The Apollo-Dynamic Corporation Limited, Mississauga, Canada

[22] Filed: Apr. 26, 1974

[21] Appl. No.: 464,544

[52] U.S. Cl. .............................. 210/170; 210/532 R
[51] Int. Cl.² .................................... B01D 43/00
[58] Field of Search ...... 210/170, 532, 244; 215/37, 215/DIG. 1, DIG. 2, DIG. 3, DIG. 4, DIG. 5

[56] References Cited
UNITED STATES PATENTS

| | | | |
|---|---|---|---|
| 2,745,586 | 5/1956 | Thoma | 215/DIG. 5 |
| 3,097,166 | 7/1963 | Monson | 210/532 S X |
| 3,201,014 | 8/1965 | Livingstone | 215/DIG. 1 |
| 3,240,343 | 3/1966 | Werner | 210/532 S X |
| 3,426,903 | 2/1969 | Olecko | 210/532 S X |
| 3,455,500 | 7/1969 | Wilcox | 215/DIG. 1 |
| 3,696,987 | 10/1972 | Schuff et al. | 215/DIG. 2 |
| 3,780,897 | 12/1973 | Wassillieff | 215/DIG. 1 |
| 3,805,986 | 4/1974 | Gaudin | 215/DIG. 3 |
| 3,817,864 | 6/1974 | Carlson et al. | 210/532 S |
| 3,826,376 | 7/1974 | Carlson et al. | 210/532 S |

Primary Examiner—Theodore A. Granger

[57] ABSTRACT

A device for disposing of organic waste material. A body conical and truncated in axial cross-section with a sealing cap removably press-fitting onto its smaller end. The device is used by implanting it in the ground and it preferably carries an outstanding flange at its larger end to inhibit tipping.

9 Claims, 4 Drawing Figures

ORGANIC WASTE DISPOSAL DEVICE

This invention relates to a device for disposing of organic waste material.

Household receptacles for the disposal of organic waste material are known in which a closable, bottomless container is partially buried in a pit in the ground. The organic waste material is introduced into the container and, preferably with the aid of enzyme additives, the waste decomposes to form compost. Such a device is disclosed in Canadian Pat. No. 639,516 issued Apr. 10, 1962. The receptacle of that patent suffers from the disadvantages that it is expensive to fabricate, cumbersome to stack and to ship, difficult to install and to use, and it is subject to leakage of odours and to penetration by flying insects.

It is an object of the present invention to provide an organic waste disposal device of simplified construction and improved sealing qualities.

In its broadest aspect the invention consists of a hollow, tapered body having the larger end open and the smaller end receiving a press-fitting cap. Preferably the body is in the form of a truncated cone and is made of high-impact, cross-linked polyethylene, and may include ultra-violet inhibitors.

An example embodiment of the invention is shown in the accompanying drawings in which.

Figure 1:
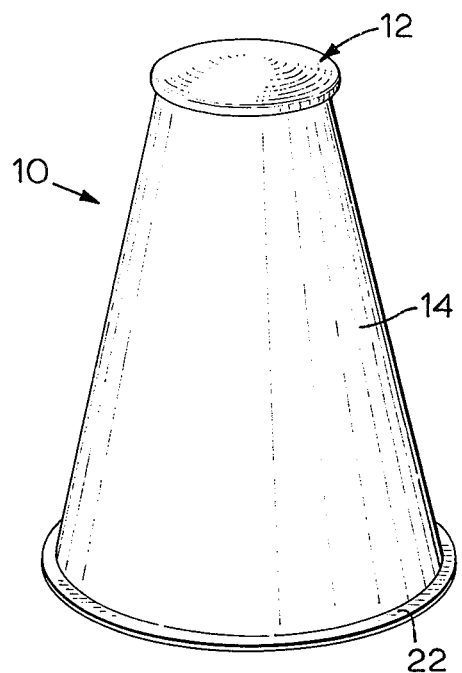
FIG. 1 is a downward perspective view of a waste disposal device.
Figure 2:
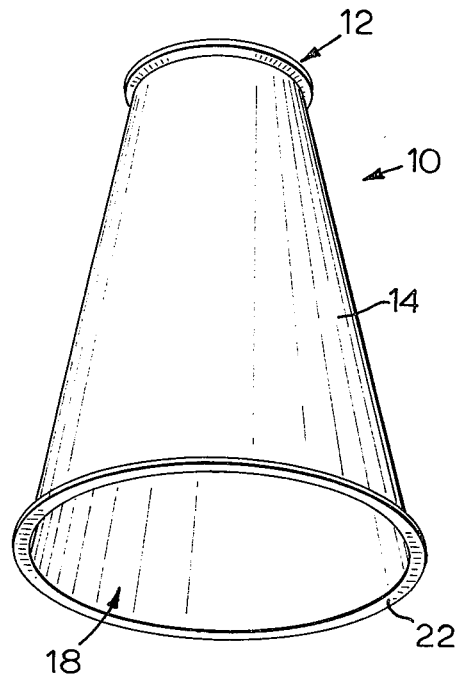
FIG. 2 is an upward perspective view of the device of FIG. 1.
Figure 3:
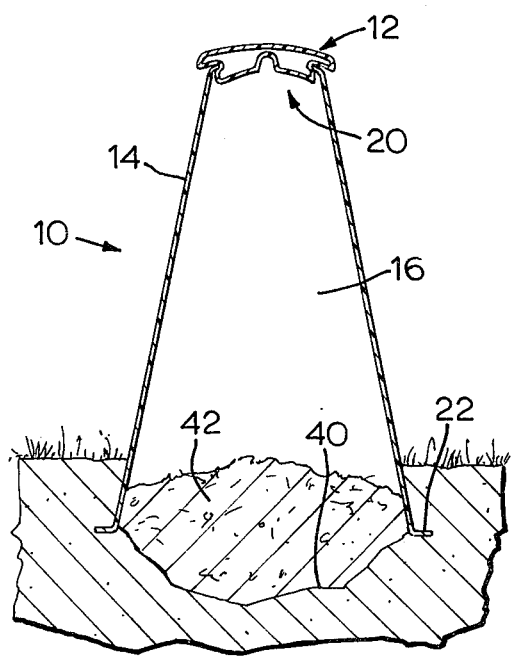
FIG. 3 is a view of the device of FIGS. 1 and 2 in vertical cross-section and in situ.
Figure 4:
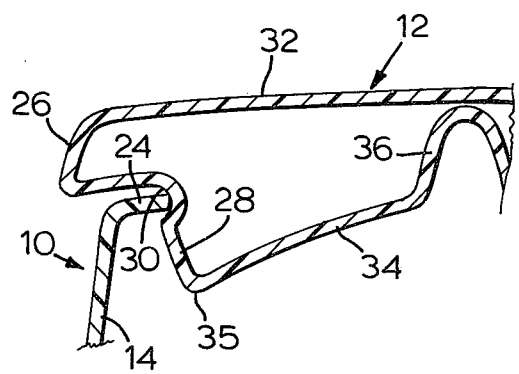
FIG. 4 is an enlarged cross-sectional view of a portion of the cap and the upper end of the device of FIG. 3 showing their interrelationship.

The example embodiment shown in the drawings consists of a container or receptacle 10 in the form of a hollow truncated cone surmounted by a removable cap or lid 12. Receptacle 10 comprises a body formed by a circular wall 14 defining a chamber 16 with an opening 18 at the larger end of the receptacle and an opening 20 at the smaller end of the receptacle. The end of wall 14 at larger opening 18 carries an annular flange 22 which is outstanding from the wall in a plane normal to the axis of the receptacle. The end of wall 14 at smaller opening 20 carries an annular lip 24 directed inwardly from the wall.

Cap 12 is constructed and arranged to press-fit onto wall 14 at smaller opening 20 and has an outer rim 26 overlying a circular side wall 28. An annular groove or recess 30 is located in side wall 28 where the side wall meets rim 26, and the side wall tapers downwardly and inwardly from the groove. Upper surface 32 of cap 12 is slightly tapered downwardly from its centre towards rim 26, say 3°. Underside 34 of cap 12 is concave to form a drip ring 35 and has a central depression 36 making the cap thin in its central portion.

In the use of the device, a circular pit 40 is dug in the ground and the lower, wider end portion of receptacle 10 is placed in the pit, the open space around the receptacle being filled with earth to anchor the receptacle firmly in the ground. Flange 22 acts as an anchor to inhibit tipping of receptacle 10, for instance if shoved by an animal, and also inhibits digging animals such as rodents from reaching material in the pits. Organic waste material 42 is charged into chamber 16 through smaller opening 20 to lie in pit 40. To seal smaller opening 20, cap 12 is pressed into the opening. Lip 24 on wall 14 rides up side wall 28 of cap 12 as the reactive pressure from the lip flexes the lid about depression 36. Lip 24 entering groove 30 snap-locks the cap into position to seal chamber 16.

Preferably receptacle 10 is manufactured from high-impact, cross-linked polyethylene although other suitable materials could be used. Besides being non-corrosive, polyethylene retains heat thereby aiding the decomposition of waste charged into the receptacle. Also, the polyethylene may include an inhibitor to the degenerative action of ultra-violet light rays which would otherwise break down the plastic.

It will be appreciated that the transverse cross-sectional shape of receptacle 10 may be other than circular; for example it may be elliptical or polygonal although the latter shape may not be as easily cleaned if the need arises. Also, wall 14 may be ribbed for additional strength.

It will also be appreciated that the shape of receptacle 10 makes it convenient to stack for shipping. The tapered upper surface 32 of cap 12 permits run-off of rain. Rim 26 provides a grip for the removal of cap 12 and depression 36 provides flexibility for the cap in press-fitting it onto receptacle 10 as described.

The term "sealing" used to describe the press-fit of cap 12 onto receptacle 10 is not meant to imply absolute air tightness but sufficient tightness to inhibit (1) the easy escape of odours, (2) the ingress of insects, and (3) the removal of the cap by animals.

The device of the invention is suitable for use with outdoor toilets. By setting receptacle 10 to have lip 24 flush with the seat, the receptacle can be closed with cap 12 when not in use. Also, the flexibility of polyethylene will allow receptacle 10 to be distorted laterally where it must be fitted into an enclosure having a lateral dimension slightly less than the diameter of the receptacle.

By using a darker colour of polyethylene, such as green, receptacle 10 retains additional heat. This heat causes liquid from organic waste material 42 in pit 40 to evaporate. The evaporated liquid condenses on underside 34 of lid 12 and on the inside surface of wall 14, returning to pit 40 and preventing organic waste material 42 from drying out, thus obtaining a richer composting action. Drip ring 35 on lid 12 allows condensed liquid to drip directly onto organic waste material 42 in pit 40. Alternately the evaporated water could be channeled off from the device and used as pure drinking water.

I claim:

1. A system for containing organic waste material comprising a receptacle body having a circumferential wall defining a chamber pyramidal and truncated in axial cross section, each end of said body defining an opening into said chamber, a cap constructed and arranged to press fit onto the body at its narrow end to provide closure means therefor, an outstanding annular flange connected to the opposite wide end of said pyramidal chamber at the peripheral edge of said circumferential wall defining an opening into said chamber, said annular flange arranged beneath the surface of the earth anchoring said receptacle in the ground at the wide end of said receptacle body whereby the narrow end of said receptacle and its closure means extends upwardly and is spaced above the surface of the ground.

2. A device as claimed in claim 1 in which the narrower end of the body carries an inturned annular lip and the cap carries a circumferential groove constructed and arranged to receive the inturned lip when the cap is pressed into the opening at the narrower end of the body.

3. A device as claimed in claim 2 in which the cap carries a rim projecting laterally from the body when the cap is press-fitted thereon, the groove being contiguous to the rim.

4. A device as claimed in claim 2 in which the cap is thin in its central portion.

5. A device as claimed in claim 1 in which the narrower end of the body carries an inturned annular lip, the cap having a circular side wall carrying a circumferential groove, the side wall tapering downwardly and inwardly from the groove whereby the lip of the body rides up over the side wall of the cap and snaps into the groove when the cap is pressed into the opening at the narrower end of the body.

6. A device as claimed in claim 2 in which the underside of the cap is tapered inwardly to form a drip ring.

7. A device as claimed in claim 1 in which the upper surface of the cap is tapered downwardly and outwardly from the central portion thereof.

8. A device as claimed in claim 4 in which at least the body is formed of high impact, cross-linked polyethylene.

9. A device as claimed in claim 8 in which the polyethylene includes an inhibitor to the degenerative action of ultra-violet light.

* * * * *